United States Patent [19]

Guilino et al.

[11] 4,240,719
[45] Dec. 23, 1980

[54] PROGRESSIVE OPHTHALMIC LENS

[75] Inventors: Gunter Guilino, Munich; Rudolf Barth, Hohenkirchen, both of Fed. Rep. of Germany

[73] Assignee: Optisch Werke G. Rodenstock, Munich, Fed. Rep. of Germany

[21] Appl. No.: 775,391

[22] Filed: Mar. 7, 1977

[30] Foreign Application Priority Data

Mar. 11, 1976 [DE] Fed. Rep. of Germany ....... 2610203

[51] Int. Cl.³ .............................................. G02C 7/02
[52] U.S. Cl. .................................................... 351/169
[58] Field of Search ......................................... 351/169

[56] References Cited

U.S. PATENT DOCUMENTS

| | | | |
|---|---|---|---|
| 2,878,721 | 3/1959 | Kanolt | 351/169 |
| 3,687,528 | 8/1972 | Maitenaz | 351/169 |
| 3,910,691 | 10/1975 | Maitenaz | 351/169 |

Primary Examiner—Conrad J. Clark
Attorney, Agent, or Firm—Jerry Cohen

[57] ABSTRACT

An eyeglass lens (ophthalmic lens) has in its upper section (far sight field) surface refraction values relative to far sight, and has in its lower section (near sight field) surface refraction values relative to near sight, and is divided into left and right sections by a line (main meridian), the points of which at least approximate geometric umbilical points (points of the same surface refraction value in the two main curvatures) in which a transition region (progression zone) is provided between the upper section and the lower section, in which the surface refraction values of the upper section change gradually into the surface refraction values of the lower section and in which all the lines of equal average refraction values of the upper section intersect the main meridian in the upper section and all the lines of the lower section intersect the main meridian in the lower section and all are extended on both ends to the periphery of the eyeglass lens. All lines of equal average surface refaction value of the progression zone intersect the main meridian in the progression zone and extend to the lens periphery. Such lens compensates for a missing power of accommodation of the human eye or one that is reduced in presbyopic age.

18 Claims, 5 Drawing Figures

| | |
|---|---|
| H | Main meridian = Umbilical point line or quasi-umbilical point line |
| F | Far-sight field |
| P | Progression zone |
| N | Near-sight field |
| $B_F$ | Optical far reference point = Site for the prescribed far correction |
| $B_N$ | Optical near reference point = Site for the prescribed near correction |
| $D_F$ | Surface refraction value in the far-sight field |
| $D_N$ | Surface refraction value in the near-sight region |
| $\bar{D}$ | Average surface refraction value |
| Add | Near addition = $D_N - D_F$ |

Fig.1

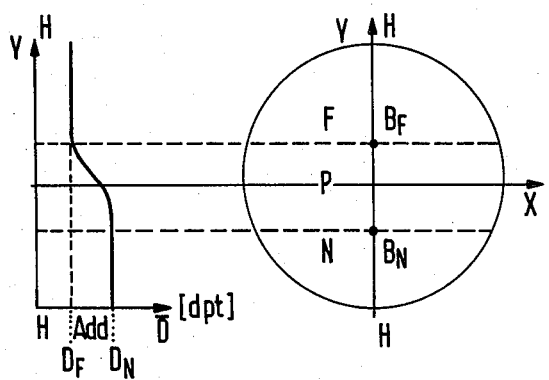

| H | Main meridian = Umbilical point line or quasi-umbilical point line |
|---|---|
| F | Far-sight field |
| P | Progression zone |
| N | Near-sight field |
| $B_F$ | Optical far reference point = Site for the prescribed far correction |
| $B_N$ | Optical near reference point = Site for the prescribed near correction |
| $D_F$ | Surface refraction value in the far-sight field |
| $D_N$ | Surface refraction value in the near-sight region |
| $\overline{D}$ | Average surface refraction value |
| Add | Near addition = $D_N - D_F$ |

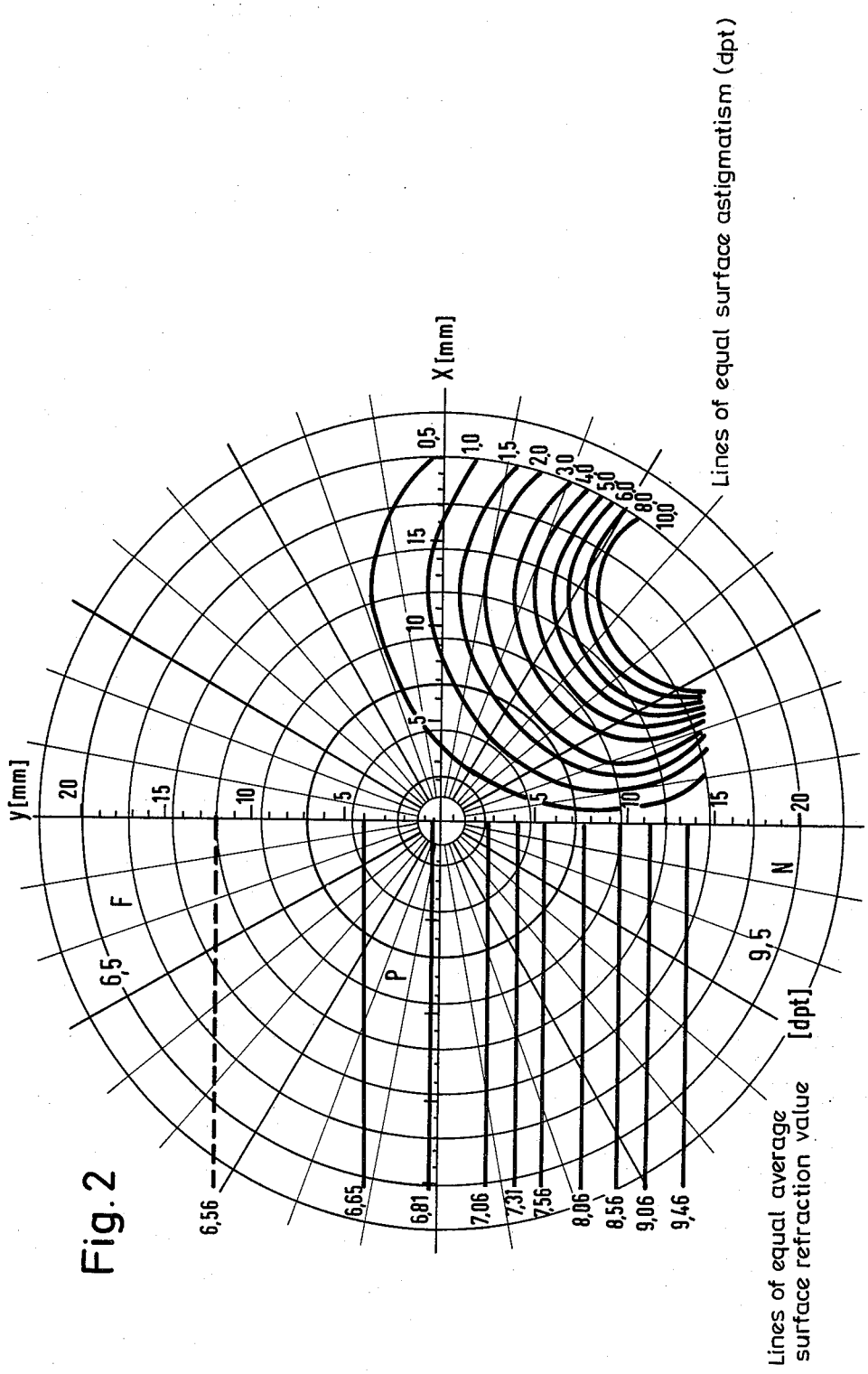

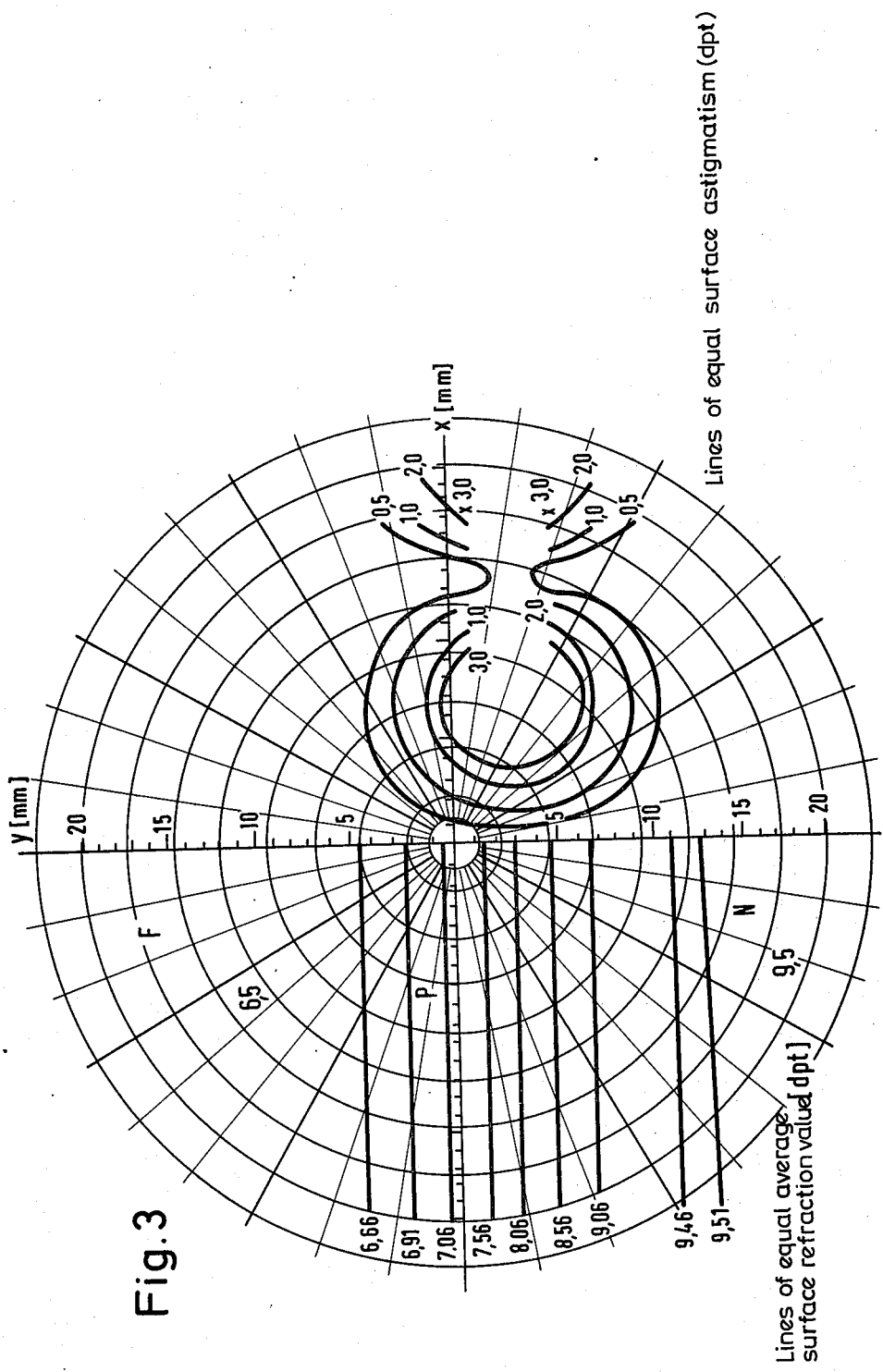

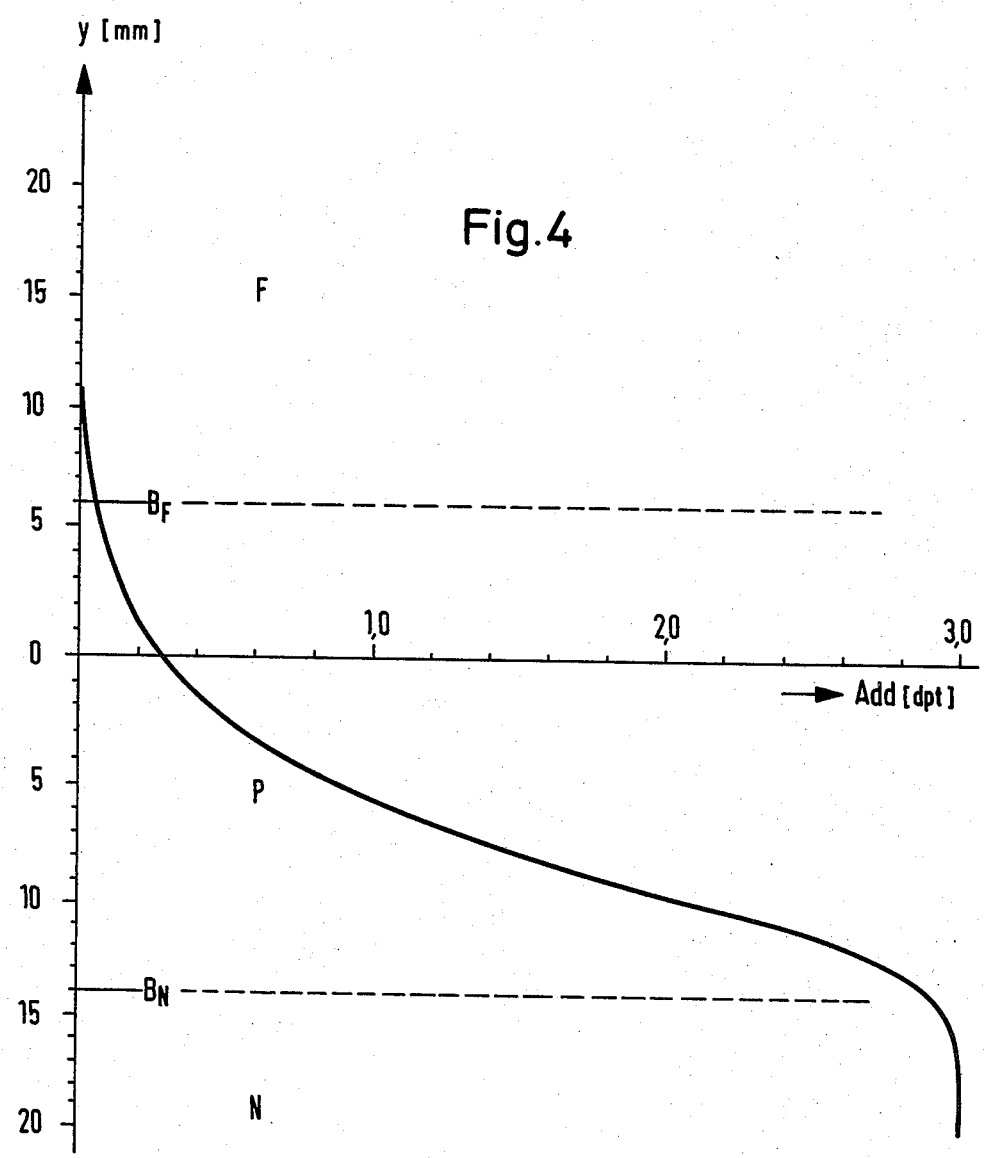

PROGRESSIVE OPHTHALMIC LENS

BACKGROUND OF THE INVENTION

The present invention relates to eyeglass (ophthalmic) lenses with progressive surfaces. A surface of such a lens has an average surface refraction value $$\overline{D} = \frac{n-1}{2}\left(\frac{1}{R_1} + \frac{1}{R_2}\right)$$

which changes continuously in any direction, where n is index of refraction and $R_1$ and $R_2$ are main curvature radii. In known lenses of this type according to French Pat. No. 1,544,799; GDR Pat. No. 71,210; French Pat. No. 2,058,499; German Offenlegungsschrift No. 2,439,127; German Auslegeschrift No. 2,044,639; and Austrian Pat. No. 322,238, progressive surfaces are formed by families of circles or conic sections, which intersect the main meridian at right angles. The main meridian is thus preferably, but not necessarily (ref: French Pat. No. 1,509,090) a plane curve, the curvature of which increases continuously from the far-sight field to the near-sight field and in which both main curvatures are of equal magnitude at each point on the progressive surface. This main meridian thus forms a so-called "umbilical line".

The present invention is related to the fact that the determining image properties of the progressive surface of a lens for the eyeglass wearer are determined by the average surface refraction value $$\overline{D} = \frac{n-1}{2}\left(\frac{1}{r_1} + \frac{1}{r_2}\right)$$

and the surface astigmatism $$\Delta D = (n-1)\left(\frac{1}{r_1} - \frac{1}{r_2}\right)$$

where $r_1$ and $r_2$ are main curvature radii, at all points on the progressive surface. All of the image properties taken together, such as sharpness of image and refraction accurateness of correction, and all characteristics by wearing, such as static and dynamic distortion and hibituation depend casually on these two values. The surface is thus clearly determined by giving the surface refraction value along an umbilical line and a family of lines of equal average surface refraction value intersecting the umbilical line.

In a desirable progressive surface, the surface refraction value D (on both sides of the umbilical line of average surface refraction value $\overline{D}$) should increase from top to bottom not only along the umbilical line, but also uniformly around the periphery, with approximately the same gradient. According to a statement (theorem) by Minkwitz (Optica Acta, 10, 1963, 223), however, next the umbilical line the surface astigmatism $\Delta D$ at a right angle to the umbilical line first increases twice, as the surface refraction value along this umbilical line changes. In addition at a greater distance from the umbilical line, the surface astigmatism is dependent on the course of lines of equal average surface refraction value and vice versa. A desirable progressive surface should now have on both sides along the main meridian either no surface astigmatism or only a slight one (e.g. <0.25 diopters). The far sight field, i.e, the section essentially above the horizontal through the so-called optical far reference point $B_F$, should have a constant average surface reference value and a small surface astigmatism (e.g. $\leq 1.0$ diopters) which is physiologically not troublesome, and which perhaps disappears far in the periphery. Accordingly, the same is true for the near sight section below the horizontal through the so-called optical near reference point $B_N$.

The known progressive surfaces only fulfill the above requirements very inadequately, or not at all, since they are given either from a purely mathematical viewpoint of a sufficiently simple geometric law of formation (see, e.g. French Pat. Nos. 2,058,499, 1,544,799, German Offenlegungsschrift No. 2,439,127) or by the manufacturing process (see, e.g. French Pat. No. 1,095,375). The necessarily resulting image properties must be taken into account. If lines $\overline{D}=$const. are calculated by this surface, sections with irregular such lines ($\overline{D}=$const.) are encountered peripherally in the progression zone. This means, in part, that there is a considerable deviation from the refraction accurateness of the glasses in this visual regions. The eyeglass wearer, for example, finds in the progression zone of glasses (according to German OS No. 2,439,127 and French Pat. No. 2,058,499) regions with a more intense negative optical effect than in the far sight region; thus the glass is under-corrected for close vision and also under-corrected for distance vision in the case of hyperopia while over-corrected in the case of myopia. In addition, in a surface in which the lines of intersection are "evolutive conic sections" perpendicular to the main meridian (French Patent 2,058,499), lines of equal average surface refraction value are curved upward and incorporated far into the far sight field. In this way hyperopia is over-corrected and myopia, under-corrected. This sort of erroneous correction causes an image sharpness which, e.g., can have dangerous consequences when the person is in traffic, if a shortsightedness increased by 1 diopter or more through the wide opened pupil remains uncorrected.

Since the distribution of the surface astigmatism over the surface depends on the course of the lines of equal average surface refraction value and on the increase in curvature of the umbilical line, the known embodiments of progressive surfaces have considerable imperfections.

It is an important object of the invention to create the progressive surface from the physiological-optical standpoint so that the image properties and characteristics by wearing given above are improved.

SUMMARY OF THE INVENTION

The eyeglass lens as described above is basically characterized in accordance with the invention in that also in the progression zone the lines of equal average surface refraction value intersect the main meridian and extend on both ends to the periphery of the eyeglass lens. In the construction of progressive surfaces with different near sight sections and different far sight sections, according to the invention, one proceeds by determining suitably selected families of lines of the same average surface refraction value, which are combined with the proper main meridians. In this way the surface itself can be derived and shown by calculation (numerical integration of a partial differential equation of the elliptical type).

The lines of equal average surface refraction value extend from the main meridian on both sides continuously to the edge of the glass. Their course is determined from the physiological-optical standpoint such that refraction accurateness consists in the far sight section above a horizontal through the optical far reference point and in the near sight section below a horizontal through the optical near reference point with respect to the average surface refraction values and at the same time, the surface astigmatism is sufficiently small in the entire progression zone.

The eyeglass lens is preferably characterized by the fact that a finite difference exists between the two main curvatures on at least one portion of the main meridian points, which is greater than $0.01/(n-1)100$ cm$^{-1}$ and smaller than $0.25/(n-1)100$ cm$^{-1}$, and preferably smaller than or equal to $0.12/(n-1)100$ cm$^{-1}$.

The main meridian is thus not given as an exact umbilical line. One can thus displace the basically unavoidable surface astigmatism away from the main meridian which impairs lateral vision in the progression zone. Therefore a considerably widened far sight-near sight field transition region which is important for clear vision, is obtained. If an exact umbilical line were provided as the main meridian, then an expansion of the optically useful transition region would not be possible, since the above-given (scientifically correct and inevitable) statement by Minkwitz would be contradicted.

In another embodiment of the invention, the eyeglass lens is preferably characterized by the fact that the curvature change along the main meridian has its maximum value in or near the center of the progression zone—preferably at a position of about 0.5 times the value of the additional (incremental) diopter values from far to near field. This produces astigmatism values which are properly small in the far sight and near sight sections. Therefore the change in curvature runs on both sides of this maximum value, preferably—at least approximately—symmetrically. In this way the astigmatism will be kept very small in the far sight and near sight regions.

In another embodiment of the invention, the eyeglass lens is preferably characterized in that the change in curvature along the main meridian has its maximum value in or next to the lower edge of the progression zone—preferably at a position lying between the $0.5\times$ and the $0.9\times$ value of the additional (incremental) diopter values. In this way, the maximum values of the surface astigmatism in the near sight region will be deflected to the lower side regions which are not important for close vision.

Lines of equal surface refraction value proceed preferably substantially horizontally—at least approximately—in the progression zone. In this way the surface refraction values in the side regions are approximately the same as those in the main meridian and thus under-corrections will be avoided in these regions.

In addition, lines of the same average surface refraction value proceed preferably substantially horizontally—at least approximately—in the upper and/or lower sections. In this way the refraction accuracy consists in the upper region with respect to the average surface refraction values and the surface astigmatism in this region becomes increasingly smaller and disappears.

In another embodiment of the invention, the lens is characterized in that lines of equal average surface refraction value proceed, curved downward in the lower region with increasing distance from upper margin of the progression zone so as to deflect outward the surface astigmatism values in the near-sight field which are too high and occur in unsymmetrical main meridians.

Lines of equal average surface refraction value can intersect the main meridian at an angle slightly different from 90°, if this latter is not an exact umbilical line, or if it is an exact umbilical line, must not proceed at a distance from it in a right angle to it. It suffices if this angle is $90°\pm10°$. In this way it is possible to obtain in both eyes the same image quality in the two different positions looking through the eyeglasses for side vision (e.g. nasal in left eye and temporal in right).

Since the axes of the eye converge in close vision, the main meridian does not necessarily proceed vertically, but can proceed under an angle of $\pm10°$ to the vertical, whereby it comes together preferably converging down toward the nose (rather than converging upwardly).

Other objects, features and advantages of the invention will be apparent from the following detailed description of preferred embodiments, taken with reference to the enclosed drawing in which,

BRIEF DESCRIPTION OF THE DRAWING

FIG. 1 is a diagram showing the concept employed;

FIGS. 2–3 are optical correction diagrams showing two possibilities for determining lines of equal average refraction value according to preferred embodiments of the invention and the consequences resulting therefrom;

FIGS. 4 and 5 similarly show two possibilities for determining the surface refraction values along the main meridian according to preferred embodiments of the invention.

DETAILED DESCRIPTION OF PREFERRED EMBODIMENTS

Figure 5:
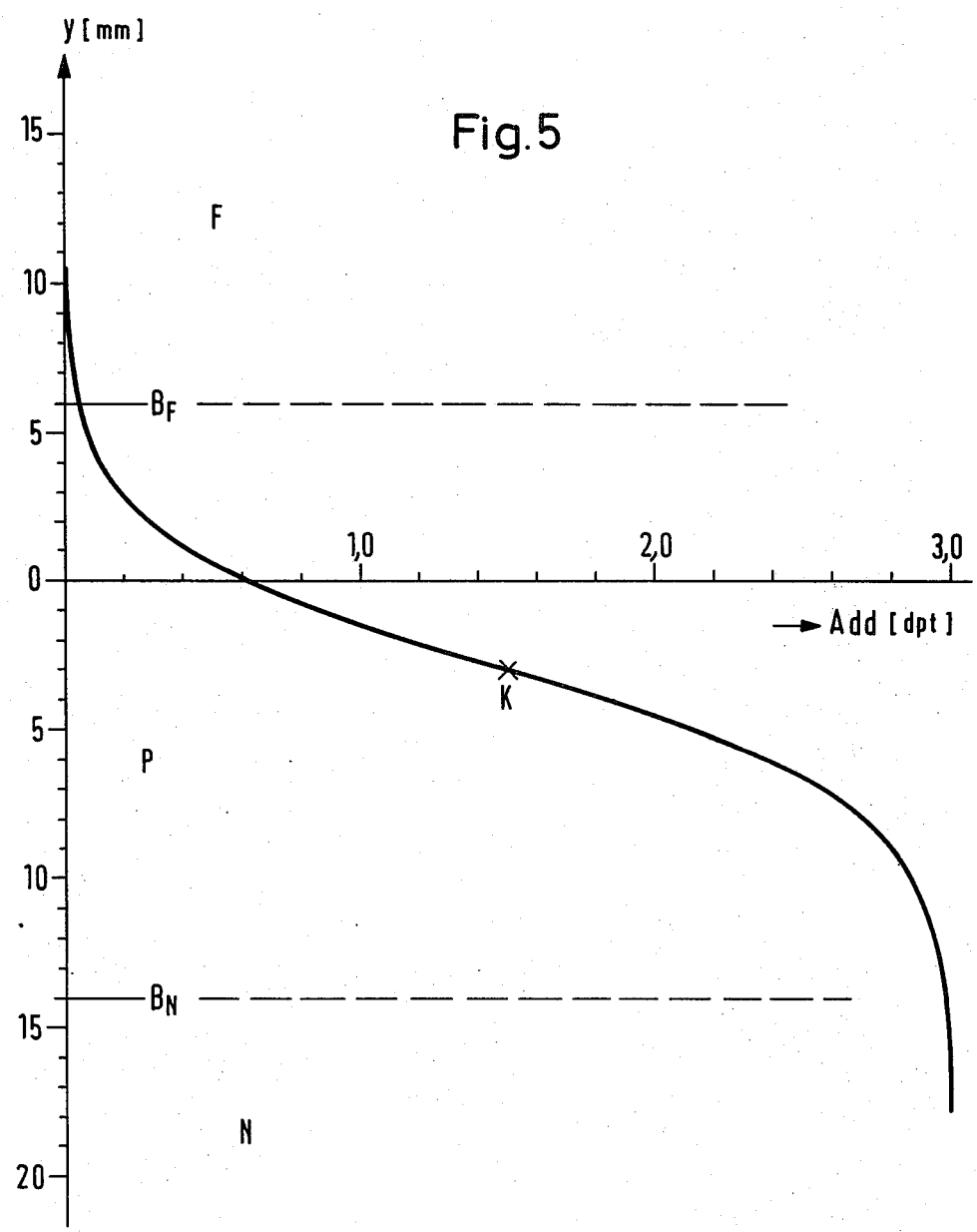

FIG. 1 shows a progressive lens diagrammatically and illustrates the terms used herein as follows:

H Main meridian = umbilical point line or quasi-umbilical point line
F Far-sight field
P Progression zone
Near-sight field
$B_F$ Optical far reference point = Site for the prescribed far correction
$B_N$ Optical near reference point = Site for the prescribed near correction
$D_F$ Surface refraction value in the far-sight field
$D_N$ Surface refraction value in the near-sight region
$\overline{D}$ Average surface refraction value
Add Near addition $= D_N - D_F$ Using FIG. 1 as background, FIGS. 2–3 show polar diagrams with x and y axes (in mm) of two embodiments of lenses wherein there is superimposed in each case on the lefthand side, lines of equal average surface refraction value (in diopters) and on the right side, lines of equal surface astigmatism (in diopters).

In the design according to FIGS. 1–2, the surface refraction value is 6.5 in the far sight field and 9.5 in the near sight field. The surface refraction value gradually increase in progression zones P. Lines of equal surface refraction value run horizontally. In the right half of FIG. 2, it can be seen that the surface astigmatism practically disappears in the far-sight field and in the upper region of the progression zone, while it still increases to high values in the lower right field. Thus, the maximum values of the surface astigmatism lie in a field which is practically not used in close vision. If lines of equal average surface refraction value were curved downward in the near sight section with increasing distance from the upper margin of the progression zone, these high surface astigmatism values would be considerably smaller.

In the design according to FIGS. 1 and 3, lines of equal average surface refraction value are the same as in FIGS. 1-2 but the increase is different from the far sight region to the near sight region. In the upper and lower sections, the surface astigmatism practically disappears; only the surface astigmatism below the central region increases to values up to 3.

The surface refraction value along the main meridian, which is shown in FIG. 4 (with reference to FIG. 1 too), corresponds to the design according to FIGS. 1-2.

The surface refraction value along the main meridian, which is shown in FIG. 5, corresponds to the design according to FIGS. 1, 3.

In the design according to FIG. 4, the maximum K value for change in curvature is 1.8 diopters ($0.6 \times 3$ diopters) and in FIG. 5, 1.5 diopters ($0.5 \times 3$ diopters).

The preferred embodiment examples explained above give possible, yet not optimal solutions for all cases. However, optimal solutions in any particular case according to the principle which forms the basis of the invention can be determined by those skilled in the art without any fundamental difficulties:

(a) One determines the surface refraction values along the main meridian and lines of equal average surface refraction value from the main meridian to the periphery of the eyeglass lens.

(b) Thus, lines of equal average surface astigmatism can be calculated and checked to see whether they conform to desires.

(c) But one will always find that lines with equal average surface astigmatism are more favorable and the surface astigmatism is lower than it is when lines of equal average surface refraction value are determined, which begin at the periphery of the eyeglass lens and also end there, as presently is the case in all known progressive eyeglass lenses due to their different viewpoint of adequate construction.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. In an Ophthalmic lens with a surface which has a far-sight field with surface refraction values corresponding to far sight in its upper region, a near-sight field which has surface refraction values corresponding to near sight in its lower section, is divided into left and right sections by a main meridian, the points of which are at least approximate umbilical points wherein a progression zone is provided between the upper region continuously changing into the surface refraction values of the lower section, with lines of equal average surface refraction value intersecting the main meridian in the upper and lower sections being extended on both ends to the periphery of the ophthalmic lens, the improvement wherein at least one portion of the points of the main meridian have a finite difference between the two main curvatures which amounts to more than $0.01/(n-1)100$ and less than $0.25/(n-1)100$ cm$^{-1}$ where n is index of refraction.

2. Ophthalmic lens according to claim 1 wherein the change in curvature along the main meridian has its maximum value near the center of the progression zone, at a position of substantially at the location corresponding to $0.5 \times$ the value of the incremental diopters from far to near field.

3. Ophthalmic lens according to claim 2 wherein change in curvature in the progression zone proceeds substantially symmetrically on both sides of its maximum value.

4. Ophthalmic lens according to claim 1 wherein the change in curvature along the main meridian has its maximum value in a range defined substantially between $0.5 \times$ and $0.8 \times$ the value of the incremental diopters from far to near field, near the lower edge of the progression zone.

5. Ophthalmic lens according to claim 1 wherein the lines of equal average surface refraction value in the progression zone run substantially horizontally.

6. Ophthalmic lens according to claim 1 wherein lines of the same average surface refraction value in at least one of the near and far field regions run substantially horizontally.

7. Ophthalmic lens according to claim 1 wherein lines of equal average surface refraction value are curved progressively downward with increasing distance from the progression zone.

8. Ophthalmic lens according to claim 1 wherein the main meridian extends at an angle within $\pm 10°$ to the vertical including 0.

9. Ophthalmic lens according to claim 1 wherein the change in curvature along the main meridian has its maximum value in the range defined essentially between $0.5-1.0 \times$ incremental diopters from far to near field.

10. Ophthalmic lens with a surface which has a far sight field with a substantially constant surface refraction value corresponding to far sight in its upper region, a near sight field which has a substantially constant surface refraction value corresponding to near sight in its lower section, is divided into left and right sections by a main meridian, the points of which are at least approximate umbilical points wherein a progression zone is provided between the upper and the lower region, in which progression zone the surface refraction values of the upper region continuously change into the surface refraction values of the lower section, all the lines of equal average surface refraction value on the one hand intersecting the main meridian in the upper and lower sections and on the other hand extending by both ends to the periphery of the ophthalmic lens, the improvement wherein, all the lines of equal average surface refraction value in the progression zone on the one hand intersect the main meridian and on the other hand extend by both ends to the periphery of the ophthalmic lens and wherein, at least one portion of the points of the main meridian have a finite difference between the two main curvatures which amounts to more than $0.01/(n-1)100$ cm$^{-1}$ and less than $0.25/(n-1)$ 100 cm$^{-1}$, where n is index of refraction of the lens material.

11. Ophthalmic lens with a surface which has a far sight field with a substantially constant surface refraction value corresponding to far sight in its upper region, a near sight field which has a substantially constant surface refraction value corresponding to near sight in its lower section, is divided into left and right sections by a main meridian, the points of which are at least approximate umbilical points wherein a progression zone is provided between the upper and the lower region, in which progression zone the surface refraction values of the upper region continuously change into the surface refraction values of the lower section, all the lines of equal average surface refraction value on the one hand intersecting the main meridian in the upper and lower sections and on the other hand extending by both ends to the periphery of the ophthalmic lens, the improvement wherein, all the lines of equal average surface refraction value in the progression zone on the one hand intersect the main meridian and on the other hand extend by both ends to the periphery of the ophtalmic lens and wherein, the change in curvature along the main meridian has its maximum value in a range defined substantially between $0.5 \times$ and $0.9 \times$ the value of the additional diopters from the far sight field to the near-sight field.

12. Ophthalmic lens with a surface which has a far sight field with a substantially constant surface refraction value corresponding to far sight in its upper region, a near sight field which has a substantially constant surface refraction value corresponding to near sight in its lower section, is divided into left and right sections by a main meridian, the points of which are at least approximate umbilical points wherein a progression zone is provided between the upper and the lower region, in which progression zone the surface refraction values of the upper region continuously change into the surface refraction values of the lower section, all the lines of equal average surface refraction value on the one hand intersecting the main meridian in the upper and lower sections and on the other hand extending by both ends to the periphery of the ophthalmic lens, the improvement wherein, all the lines of equal average surface refraction value in the progression zone on the one hand intersect the main meridian and on the other hand extend by both ends to the periphery of the ophtalmic lens and wherein, the lines of equal average surface refraction value in the progression zone run substantially horizontally within an angle of $\pm 5°$, 13. Ophthalmic lens with a surface which has a far sight field with a substantially constant surface refraction value corresponding to far sight in its upper region, a near sight field which has a substantially constant surface refraction value corresponding to near sight in its lower section, is divided into left and right sections by a main meridian, the points of which are at least approximate umbilical points wherein a progression zone is provided between the upper and the lower region, in which progression zone the surface refraction values of the upper region continuously change into the surface refraction values of the lower section, all the lines of equal average surface refraction value on the one hand intersecting the main meridian in the upper and lower sections and on the other hand extending by both ends to the periphery of the ophthalmic lens, the improvement wherein, all the lines of equal average surface refraction value in the progression zone on the one hand intersect the main meridian and on the other hand extend by both ends to the periphery of the ophtalmic lens and wherein, the lines of equal average surface refraction value in at least one of the near and far field regions run substantially horizontally within an angle of $\pm 5°$.

14. Ophthalmic lens with a surface which has a far sight field with a substantially constant surface refraction value corresponding to far sight in its upper region, a near sight field which has a substantially constant surface refraction value corresponding to near sight in its lower section, is divided into left and right sections by a main meridian, the points of which are at least approximate umbilical points wherein a progression zone is provided between the upper and the lower region, in which progression zone the surface refraction values of the upper region continuously change into the surface refraction values of the lower section, all the lines of equal average surface refraction value on the one hand intersecting the main meridian in the upper and lower sections and on the other hand extending by both ends to the periphery of the ophthalmic lens, the improvement wherein, all the lines of equal average surface refraction value in the progression zone on the one hand intersect the main meridian and on the other hand extend by both ends to the periphery of the ophtalmic lens and wherein, the main meridian is not an exact umbilical line and lines of equal average surface refraction value intersect the main meridian, at an angle of $90° \pm 10°$.

15. Ophthalmic lens with a surface which has a far sight field with a substantially constant surface refraction value corresponding to far sight in its upper region, a near sight field which has a substantially constant surface refraction value corresponding to near sight in its lower section, is divided into left and right sections by a main meridian, the points of which are at least approximate umbilical points wherein a progression zone is provided between the upper and the lower region, in which progression zone the surface refraction values of the upper region continuously change into the surface refraction values of the lower section, all the lines of equal average surface refraction value on the one hand intersecting the main meridian in the upper and lower sections and on the other hand extending by both ends to the periphery of the ophthalmic lens, the improvement wherein, all the lines of equal average surface refraction value in the progression zone on the one hand intersect the main meridian and on the other hand extend by both ends to the periphery of the ophtalmic lens and wherein, the main meridian is essentially an exact umbilical line, and lines of equal average surface refraction value at a small distance of less than 2 mm from the main meridian run at an angle of $90° \pm 10°$ (but not at $90°$).

16. Ophthalmic lens with a surface which has a far sight field with a substantially constant surface refraction value corresponding to far sight in its upper region, a near sight field which has a substantially constant surface refraction value corresponding to near sight in its lower section, is divided into left and right sections by a main meridian, the points of which are at least approximate umbilical points wherein a progression zone is provided between the upper and the lower region, in which progression zone the surface refraction values of the upper region continuously change into the surface refraction values of the lower section, all the lines of equal average surface refraction value on the one hand intersecting the main meridian in the upper and lower sections and on the other hand extending by both ends to the periphery of the ophthalmic lens, the improvement wherein, all the lines of equal average surface refraction value in the progression zone on the one hand intersect the main meridian and on the other hand extend by both ends to the periphery of the opthalmic lens and wherein, the main meridian extends at an angle within ±10° to the vertical including 0.

17. Ophthalmic lens, with upper and lower regions, which has average refraction values corresponding to far sight in its upper region which has average refraction values corresponding to near sight in its lower region, which is divided on one of the lens' surfaces into a left and right region by a main meridian line, the points of which are at least approximate umbilical points (points of equal surface refraction value in the two main curvatures), in which a progression zone is provided between the upper region and the lower region, in which the average refraction values of the upper region continuously change into the average refraction values of the lower region, all lines of equal average refraction value in the upper region, in the transition region, and in the lower region, intersecting the main meridian, and extending on both ends up to the periphery of the lens, and characterized in that the lines of equal average refraction value are lines of equal average surface refraction value on those surfaces on which the lines are located, the points of which are at least substantially umbilical points.

18. Ophthalmic lens, which has average refraction values corresponding to far sight in an upper region, which has average refraction values corresponding to near sight in a lower region, which is divided on one of its surfaces into a left and a right region by a progressively curved main meridian, for whose points, the surface astigmatism if less than 0.25 dpt, in which a progression zone is provided between the upper region and the lower region, in which the average refraction values of the upper region continuously change into the average refraction values of the lower region, and in which, the upper region, in the progression zone, and in the lower region, all lines of the same average refraction value intersect the main meridian and extend on both ends up to the periphery of the lens, and characterized in that the lines of equal average refraction value are lines of equal average surface refraction value for those surfaces on which the progressively curved main meridian is located, and in that the lines of equal average surface refraction value run horizontally in the entire progression zone.

* * * * *